Aug. 31, 1943.　　J. G. RITTER　　2,328,296
FLUID TRANSLATING APPARATUS
Filed Aug. 3, 1940　　2 Sheets-Sheet 2

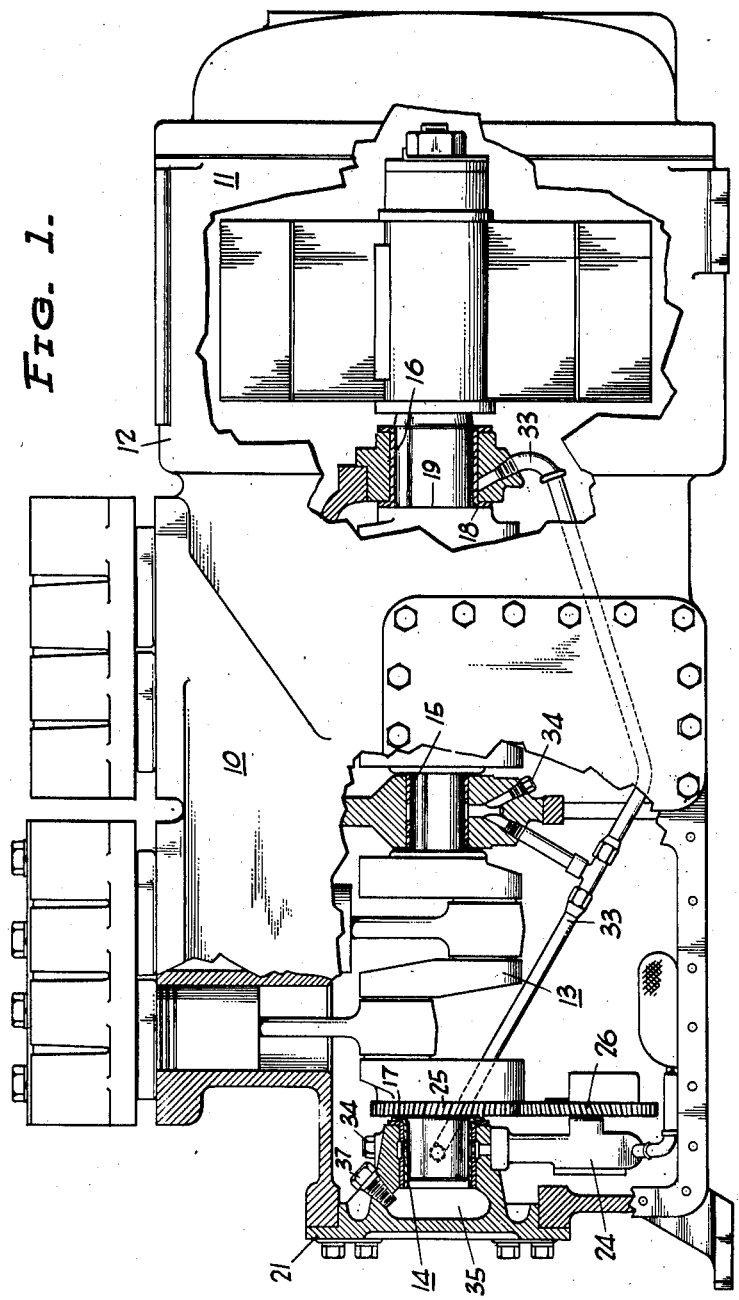

WITNESSES:

INVENTOR
JOHN G. RITTER
BY
ATTORNEY

Patented Aug. 31, 1943

2,328,296

UNITED STATES PATENT OFFICE 2,328,296

FLUID TRANSLATING APPARATUS

John G. Ritter, Springfield, Mass., assignor to Westinghouse Electric & Manufacturing Company, East Pittsburgh, Pa., a corporation of Pennsylvania Application August 3, 1940, Serial No. 350,207

4 Claims. (Cl. 184—6)

My invention relates to fluid translating apparatus, more particularly to a motor compressor unit of the enclosed type used in a refrigerating system, and it has for an object to provide improved apparatus.

A particular object is to prevent or control lengthwise oscillation of the rotating shaft in motor compressor units of the enclosed type.

In a number of motor compressor units used in refrigerating apparatus, difficulty was encountered due to failure of the oil pump. These units were provided with oil pumps driven by the rotating shaft through helical gears. The teeth of these gears had been worn about one-half way through and had broken off. In investigating one of these failures, I found that there was considerable end clearance of the shaft, and I concluded that the difficulty was probably due to lengthwise oscillation of the shaft which might be caused by several conditions under which the unit was operating. Due to the angle of the gear teeth, such oscillations would accelerate and decelerate the oil pump.

In similar units previously constructed, such oil pump failures had not occurred to any appreciable extent. Those units were not of the enclosed type but had shaft seals which biased the shaft lengthwise and which apparently held the shaft against its thrust bearing and thereby minimized or controlled the lengthwise movement of the shaft.

In the preferred embodiment of my invention, the end bearing of the compressor remote from the motor is formed with a chamber, and I introduce oil under suitable pressure into this chamber to bias the end of the shaft against the thrust bearing at the motor end. In motor compressor units embodying this invention, no oil pump failures have occurred.

These and other objects are effected by my invention as will be apparent from the following description and claims taken in connection with the accompanying drawings, forming a part of this application, in which:

Fig. 1 is a side elevation, with parts in section, of a motor-compressor unit incorporating my invention;

Figure 3:
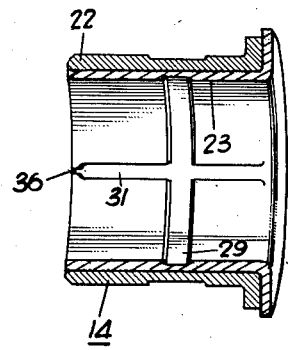
Fig. 3 is a sectional perspective view of the bearing shell and lining, the section being taken on the line III—III of Fig. 2.
Figure 2:
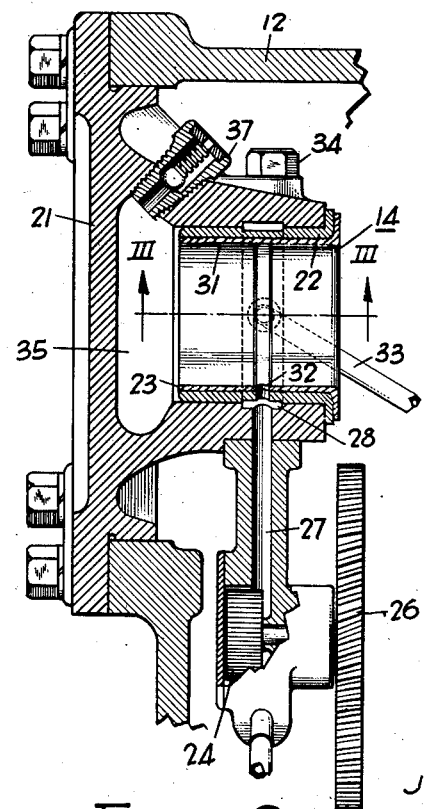
Fig. 2 is an enlarged detail sectional view.

Referring to the drawings in detail, I show a motor-compressor unit which includes a reciprocating compressor 10 and a motor 11 directly connected to the compressor for driving the same. The compressor and the motor are enclosed in a common fluid-tight casing 12, so that it is not necessary to provide a shaft seal between the compressor and the motor.

The compressor 10 may be of any construction suitable for a reciprocating compressor and includes a crank shaft 13. The compressor is provided with an end bearing 14, an intermediate bearing 15 and a motor end bearing 16. Each of these bearings includes a journal bearing portion and the end bearings 14 and 16 also include thrust bearing portions which may be referred to as the thrust bearings 17 and 18, respectively. The crank shaft is formed with a thrust shoulder 19 which engages the thrust bearing 18. The bearing 14 includes a cap member 21, which forms a closure for the crank case, a bearing shell 22 and a bearing lining 23.

The lubrication system for the unit includes an oil pump 24 driven by the crank shaft 13 through gears 25 and 26. The gears 25 and 26 are formed with suitable meshing helical gear teeth. Oil is supplied from the pump 24 to the bearings through suitable passages including a vertical passage 27 and an annular passage 28 formed between the bearing member 21 and the bearing shell 22. The bearing lining 23 is formed with an annular groove 29 and a longitudinally-extending groove 31, and the bearing shell 22 and the lining 23 are formed with registering ports 32, so that oil from the annular passage 28 may flow through the ports 32 and the grooves 29 and 31 to lubricate the bearing 14. Suitable conduits 33 extend from the annular passage 28 to the bearings 15 and 16 to provide oil thereto. In order to control the pressure of the oil supplied to the bearings, suitable pressure relief valves 34 are provided and are set to maintain a pressure of 40#/sq. in.

In accordance with my invention, I utilize the oil pressure developed by the pump 24 for applying pressure endwise on the crankshaft 13 to hold it against the thrust bearing 16, thereby to prevent lengthwise oscillations of the crank shaft. The bearing member 21 is formed with a chamber 35; and, to supply oil under pressure to this chamber, I provide an orifice 36 connecting the groove 31 with the chamber 35. I also provide a pressure-relief valve 37 controlling the escape of oil from the chamber 35. The pressure to be maintained in the chamber 35 should be sufficient to maintain the shaft against the thrust bearing 18 but at the same time, it should not be so great as to cause undue friction with said thrust bearing. Accordingly, the pressure in the chamber 35 will ordinarily be lower than the pressure of the oil supplied to the bearings. For example, I ordinarily prefer to maintain a pressure of about 11 pounds per square inch in the chamber 35, and the pressure-relief valve 37 is designed or adjusted to maintain such pressure.

In the operation of the motor-compressor unit, the pump 24 draws oil from the body of oil provided in the bottom of the crankcase, and discharges the same under pressure. The several passages convey the oil to the bearings and the pressure-relief valves maintain the pressure of the oil in these passages substantially constant. The orifice 36 permits a restricted flow of oil supplied to the bearing 14 from the groove 31 to the chamber 35. The pressure-relief valve 37 maintains the pressure in the chamber 35 at substantially 11 pounds per square inch by controlling the discharge of oil to the crankcase. The fluid pressure in the chamber 35 biases the crankshaft toward the motor end, thereby maintaining the thrust shoulder 19 in contact with the thrust bearing 18. The crankshaft is thereby maintained in a fixed axial position and lengthwise oscillations thereof are prevented or at least controlled so as to be unobjectionable.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with a machine having a horizontal rotating shaft, bearings therefor including journal bearings and a thrust bearing forming a positive stop that limits endwise movement of the shaft and thereby positions the shaft, an oil pump and gears having helical teeth for driving the oil pump from said shaft, of means for imposing a substantially constant fluid pressure on said shaft biasing the same lengthwise against said thrust bearing, the axial forces, other than said fluid pressure, biasing said shaft against said thrust bearing being insufficient to prevent axial oscillation of the shaft.

2. The combination with a machine having a horizontal rotating shaft, bearings therefor including journal bearings and a thrust bearing forming a positive stop that limits endwise movement of the shaft and thereby positions the shaft, an oil pump and gears having helical teeth for driving the oil pump from said shaft, of means for preventing lengthwise oscillation of the shaft comprising means providing a chamber arranged so that the fluid pressure therein biases the shaft axially against said thrust bearing, means for supplying oil under pressure to said chamber, and means maintaining the pressure of the oil in said chamber substantially constant, the axial forces on said shaft, other than said fluid pressure, being insufficient to prevent axial oscillation of the shaft.

3. The combination with a machine having a horizontal rotating shaft, bearings therefor including journal bearings and a thrust bearing, an oil pump for lubrication of said bearings, and gears having helical teeth for driving said oil pump from said shaft, of means for preventing lengthwise oscillation of the shaft comprising means providing a chamber arranged so that the fluid pressure therein biases the shaft axially against said thrust bearing, means for conveying oil under pressure from said pump to said bearings, a pressure relief valve for exhausting oil from said conveying means to maintain said pressure substantially constant, means including an orifice for providing a restricted flow of oil from the conveying means to said chamber, a second pressure relief valve for exhausting oil from said chamber and maintaining the pressure therein at substantially constant value lower than the pressure in said conveying means.

4. The combination with a motor-compressor unit having a casing forming a fluid-tight enclosure for the compressor and the motor and including a horizontal rotating shaft, bearings therefor including a thrust bearing forming a positive stop that limits endwise movement of the shaft and thereby positions the shaft, an oil pump, and gears having helical gear teeth for driving the oil pump from said shaft, of means for preventing lengthwise oscillation of the shaft comprising means for imposing fluid pressure on said shaft biasing the same lengthwise against said thrust bearing, the axial forces on said shaft, other than said fluid pressure, being insufficient to prevent lengthwise oscillation of the shaft.

JOHN G. RITTER.